(12) United States Patent
Furuya et al.

(10) Patent No.: US 12,064,937 B2
(45) Date of Patent: Aug. 20, 2024

(54) LAMINATE AND METHOD FOR PRODUCING SAME

(71) Applicant: SHOWA DENKO K.K., Tokyo (JP)

(72) Inventors: Akira Furuya, Tokyo (JP); Tadaaki Kojima, Tokyo (JP); Hiroshi Suzuki, Tokyo (JP); Fumiaki Naka, Tokyo (JP)

(73) Assignee: Resonac Corporation, Tokyo (JP)

( * ) Notice: Subject to any disclaimer, the term of this patent is extended or adjusted under 35 U.S.C. 154(b) by 108 days.

(21) Appl. No.: 17/614,172

(22) PCT Filed: Aug. 11, 2020

(86) PCT No.: PCT/JP2020/030620
§ 371 (c)(1),
(2) Date: Nov. 24, 2021

(87) PCT Pub. No.: WO2021/049235
PCT Pub. Date: Mar. 18, 2021

(65) Prior Publication Data
US 2022/0227104 A1    Jul. 21, 2022

(30) Foreign Application Priority Data

Sep. 13, 2019   (JP) .................. 2019-167048

(51) Int. Cl.
*B32B 15/01* (2006.01)
*C25D 5/14* (2006.01)
*C25D 5/50* (2006.01)

(52) U.S. Cl.
CPC .......... *B32B 15/013* (2013.01); *B32B 15/017* (2013.01); *B32B 15/018* (2013.01); *C25D 5/14* (2013.01); *C25D 5/50* (2013.01)

(58) Field of Classification Search
CPC ... B32B 15/013; B32B 15/017; B32B 15/018; C25D 5/14; C25D 5/50
See application file for complete search history.

(56) References Cited

U.S. PATENT DOCUMENTS

| 6,258,411 B1 | 7/2001 | Ohmi et al. |
| 6,280,597 B1 | 8/2001 | Kashiwada et al. |

(Continued)

FOREIGN PATENT DOCUMENTS

| CN | 100392151 C | 6/2008 |
| CN | 102978671 A | 3/2013 |

(Continued)

OTHER PUBLICATIONS

[NPL-1] Namikawa (JP 2001-324360 A), Aug. 31, 2001 (EPO machine translation to English). (Year: 2001).*

(Continued)

*Primary Examiner* — David Sample
*Assistant Examiner* — Donald M Flores, Jr.
(74) *Attorney, Agent, or Firm* — Sughrue Mion, PLLC

(57) ABSTRACT

A laminate including a metallic base material, a first nickel-containing plating film layer formed on the metallic base material, a gold plating film layer formed on the first nickel-containing plating film layer, a second nickel-containing plating film layer formed on the gold plating film layer, and a nickel fluoride film layer formed on the second nickel-containing plating film layer. Also disclosed is a method for producing the laminate as well as a constituent member of a semiconductor production device including the laminate.

14 Claims, 1 Drawing Sheet

(56) References Cited

U.S. PATENT DOCUMENTS

| | | | |
|---|---|---|---|
| 6,872,470 | B2 | 3/2005 | Minamikawa |
| 8,273,466 | B1 * | 9/2012 | Saraiya ............... C23C 18/1651 |
| | | | 428/680 |
| 8,933,336 | B2 | 1/2015 | Yoshida et al. |
| 11,143,800 | B2 | 10/2021 | Ballou et al. |
| 2003/0022017 | A1 | 1/2003 | Minamikawa |
| 2003/0107112 | A1 | 6/2003 | Tellkamp |
| 2010/0183898 | A1 | 7/2010 | Imai et al. |
| 2010/0258954 | A1 | 10/2010 | Andoh |
| 2011/0048774 | A1 | 3/2011 | Sato et al. |
| 2013/0126208 | A1 | 5/2013 | Yoshida et al. |
| 2018/0364402 | A1 | 12/2018 | Ballou et al. |

FOREIGN PATENT DOCUMENTS

| | | | |
|---|---|---|---|
| CN | 107531017 A | 1/2018 | |
| EP | 0 446 079 A1 | 9/1991 | |
| EP | 0 902 101 A1 | 3/1999 | |
| EP | 0 902 101 B1 | 2/2003 | |
| JP | 02-263972 A | 10/1990 | |
| JP | 05-302177 A | 11/1993 | |
| JP | 06158384 A * | 6/1994 | ............... C25D 5/14 |
| JP | 2581021 B2 | 2/1997 | |
| JP | 10-256708 A | 9/1998 | |
| JP | 2954716 B2 | 9/1999 | |
| JP | 3094000 B2 | 10/2000 | |
| JP | 2001-234360 A | 8/2001 | |
| JP | 2001234360 A * | 8/2001 | ........... C23C 28/023 |
| JP | 2004-360066 A | 12/2004 | |
| JP | 2007-287362 A | 11/2007 | |
| JP | 2008-56978 A | 3/2008 | |
| JP | 2008056978 A * | 3/2008 | |
| JP | 2008311316 A | 12/2008 | |
| JP | 2010-37603 A | 2/2010 | |
| JP | 2010-77529 A | 4/2010 | |
| JP | 2010-206162 A | 9/2010 | |
| JP | 2013-127115 A | 6/2013 | |
| JP | 2018-138687 A | 9/2018 | |
| WO | WO-2014010662 A1 * | 1/2014 | ............ B32B 15/01 |
| WO | 2018/232162 A1 | 12/2018 | |

OTHER PUBLICATIONS

[NPL-2] Kojima et al. (JP 2008-056978 A), Mar. 13, 2008 (EPO machine translation to English). (Year: 2008).*

[NPL-3] Mukai (JPWO 2014/010662 A1); Jan. 2014 (EPO machine translation to English). (Year: 2014).*

[NPL-4] Mizuno (JP H06-158384 A); Jun. 7, 1994 (EPO machine translation to English). (Year: 1994).*

International Search Report dated Oct. 20, 2020 from the International Searching Authority in International Application No. PCT/JP2020/030620.

Written Opinion dated Oct. 20, 2020 from the International Searching Authority in International Application No. PCT/JP2020/030620.

Office Action dated Apr. 7, 2021 from the Taiwanese Intellectual Property Office in TW application No. 109128341.

* cited by examiner

LAMINATE AND METHOD FOR PRODUCING SAME

CROSS REFERENCE TO RELATED APPLICATIONS

This application is a National Stage of International Application No. PCT/JP2020/030620, filed Aug. 11, 2020, claiming priority to Japanese Patent Application No. 2019-167048, filed Sep. 13, 2019.

TECHNICAL FIELD

The present invention relates to a laminate and a method for producing the same. More specifically, the present invention relates to a laminate suitable as a constituent member of devices such as semiconductor production devices, and a method for producing the laminate.

BACKGROUND ART

In a semiconductor production process, special halogen gases which are strongly reactive and corrosive such as fluorine, hydrogen chloride, boron trichloride, nitrogen trifluoride, chlorine trifluoride, and hydrogen bromide (these may be hereinafter referred to as "corrosive gas"), have conventionally been used in a dry etching step and in the cleaning of production devices for example.

However, when the above corrosive gas reacts with the moisture contained in an atmosphere and is hydrolyzed, products such as hydrogen fluoride, oxalic acid, and hydrogen chloride are generated. The products are problematic since they easily corrode metallic surfaces of constituent members such as valves, couplings, piping, and reaction chambers during the use of the corrosive gas.

In order to increase corrosion resistance, methods of plating a metallic base material with a nickel-phosphorus alloy to form a fluorinated passive film of nickel have conventionally been performed (see for example Patent Literature 1 to Patent Literature 3). However, such methods were insufficient in some cases.

Further, pinholes on a plating surface may be a reason why corrosion progresses. There seem to be several factors why pinholes occur, for example such that hydrogen gas generated by a plating reaction forms bubbles during the formation of a plating film to inhibit film formation, or such that impurities (such as an oxide film, contamination, and oil) remaining on a base material are not eliminated in a pretreatment step, resulting in the inhibition of film formation. In response to the above, Patent Literature 4 discloses an approach in which a hard alloy plating layer is formed on gold plating to increase abrasion resistance and prevent discoloration and corrosion due to a reaction such as oxidation or sulfurization attributable to gas or moisture.

CITATION LIST

Patent Literature

Patent Literature 1: JP 2954716 B2
Patent Literature 2: JP 3094000 B2
Patent Literature 3: JP 2004-360066 A
Patent Literature 4: JP 2581021 B2

SUMMARY OF INVENTION

Technical Problem

As a result of a study by the present inventors, the methods of forming a fluorinated passive film of nickel on a nickel-phosphorus alloy plating surface as disclosed in Patent Literature 1 to Patent Literature 3 were found to involve insufficient hydrochloric acid corrosion resistance in some cases, due to the occurrence of corrosion starting from pinholes in nickel-phosphorus alloy plating. The method disclosed in Patent Literature 4 had a problem that remarkably increased corrosion resistance cannot be expected since the outermost surface layer is alloy plating.

In view of the above, an object of the present invention is to provide a metallic material which can be employed as a constituent member of a semiconductor production device and excels in corrosion resistance, particularly corrosion resistance to acids.

Solution to Problem

The present invention relates to the following [1] to [14] for example.

[1] A laminate comprising a metallic base material, a first nickel-containing plating film layer formed on the metallic base material, a gold plating film layer formed on the first nickel-containing plating film layer, a second nickel-containing plating film layer formed on the gold plating film layer, and a nickel fluoride film layer formed on the second nickel-containing plating film layer.

[2] The laminate described in [1], in which pinholes in the gold plating film layer are sealed with a metal which is a nickel simple substance, and pinholes in the first and second nickel-containing plating film layers are sealed with a metal which is a gold simple substance.

[3] The laminate described in [1] or [2], in which the metallic base material comprises at least one metal selected from the group consisting of stainless steel, iron, aluminum, aluminum alloys, copper, and copper alloys.

[4] The laminate described in any one of [1] to [3], having a nickel strike layer between the metallic base material and the first nickel-containing plating film layer, and between the gold plating film layer and the second nickel-containing plating film layer.

[5] The laminate described in any one of [1] to [4], in which the first nickel-containing plating film layer comprises a nickel-phosphorus alloy plating layer having a phosphorus concentration of 8% by mass or higher and lower than 10% by mass, and the second nickel-containing plating film layer comprises a nickel-phosphorus alloy plating layer having a phosphorus concentration of 10% by mass or higher and 12% by mass or lower.

[6] The laminate described in any one of [1] to [5], in which the gold plating film layer comprises a displacement gold plating film layer and a reduction gold plating film layer in this order from the first nickel-containing plating film layer.

[7] The laminate described in any one of [1] to [6], in which the nickel fluoride film layer has a thickness of 70 nm or greater.

[8] A method for producing a laminate, comprising a step (A) of forming a first nickel-containing plating film layer on a metallic base material, a step (B) of forming a gold plating film layer on the first nickel-containing plating film layer, a step (C) of forming a second nickel-containing plating film layer on the gold plating film layer, and a step (D) of forming a nickel fluoride film layer on the second nickel-containing plating film layer.

[9] The method for producing a laminate described in [8], comprising a step (X) between the step (C) and the step (D), in which the laminate obtained in the step (C) is subjected to a heat treatment under the condition of a temperature being 250° C. or higher in order to seal pinholes in the gold plating film layer with a metal which is a nickel simple substance and seal pinholes in the first and second nickel-containing plating film layers with a metal which is a gold simple substance.

[10] The method for producing a laminate described in [8] or [9], in which the step (D) is performed in an atmosphere having a fluorine gas concentration of 8% by volume or higher at a temperature of 250° C. or higher.

[11] The method for producing a laminate described in any one of [8] to [10], comprising a step of subjecting the metallic base material to a nickel strike treatment under the condition of a current density being 3 to 20 A/dm² before the step (A) and before the step (C).

[12] The method for producing a laminate described in any one of [8] to [11], in which the step (A) comprises a step of forming a nickel-phosphorus alloy plating layer having a phosphorus concentration of 8% by mass or higher and lower than 10% by mass, and the step (C) comprises a step of forming a nickel-phosphorus alloy plating layer having a phosphorus concentration of 10% by mass or higher and 12% by mass or lower.

[13] The method for producing a laminate described in any one of [8] to [12], in which the step (B) comprises a step (b1) of forming a displacement gold plating film layer, and a step (b2) of forming a reduction gold plating film layer after the step (b1).

[14] A constituent member of a semiconductor production device, which is made up of the laminate described in any one of [1] to [7].

Advantageous Effects of Invention

The present invention is capable of providing laminates having excellent corrosion resistance, particularly excellent corrosion resistance to acids.

DESCRIPTION OF EMBODIMENTS

Figure 1A:
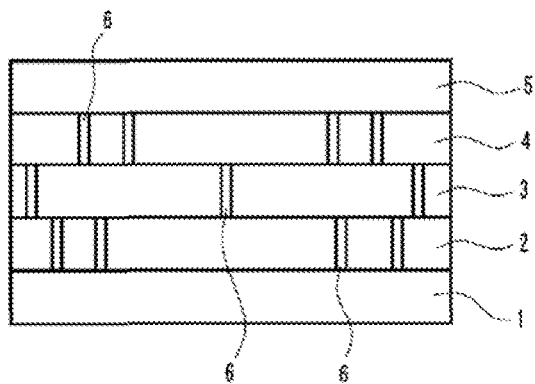
FIG. 1A is a schematic drawing showing a laminate before a sealing treatment and FIG. 1B is a schematic drawing showing a laminate after a sealing treatment.
Figure 1B:
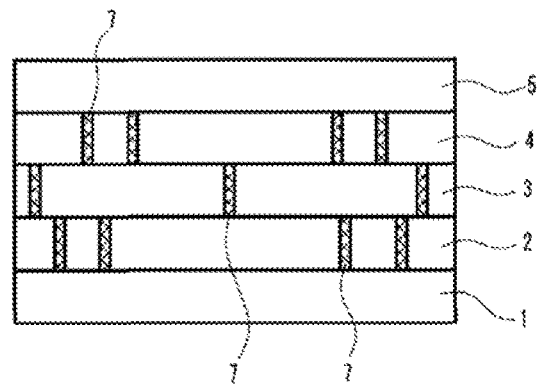

An embodiment of the present invention is specifically described below.

A laminate of an embodiment of the present invention comprises a metallic base material, a first nickel-containing plating film layer formed on the metallic base material, a gold plating film layer formed on the first nickel-containing plating film layer, a second nickel-containing plating film layer formed on the gold plating film layer, and a nickel fluoride film layer formed on the second nickel-containing plating film layer.

For the laminate of the embodiment of the present invention, it is preferred that pinholes in the gold plating film layer are sealed with a metal which is a nickel simple substance, and pinholes in the first and second nickel-containing plating film layers are sealed with a metal which is a gold simple substance.

A method for producing the laminate of the embodiment of the present invention comprises a step (A) of forming a first nickel-containing plating film layer on a metallic base material, a step (B) of forming a gold plating film layer on the first nickel-containing plating film layer, a step (C) of forming a second nickel-containing plating film layer on the gold plating film layer, and a step (D) of forming a nickel fluoride film layer on the second nickel-containing plating film layer.

In addition, the method for producing the laminate of the embodiment of the present invention preferably comprises a step (X) between the step (C) and the step (D), in which the laminate obtained in the step (C) is subjected to a heat treatment under the condition of the temperature being 250° C. or higher for 2 hours or longer in order to seal pinholes in the gold plating film layer with a metal which is a nickel simple substance and seal pinholes in the first and second nickel-containing plating film layers with a metal which is a gold simple substance.

[Metallic Base Material]

Metallic base materials used in the embodiment of the present invention have at least a surface made up of a metal. The metallic base materials are not particularly limited, and examples thereof are metals generally used in constituent members of semiconductor production devices, preferably including stainless steel, iron, aluminum, aluminum alloys, copper, and copper alloys.

In order to increase adhesion to a nickel-containing plating film layer, the metallic base materials may be subjected to a pretreatment for the step (A) such as degreasing, acid cleaning, or a nickel strike treatment depending on the base materials. The nickel strike treatment is a preliminary plating treatment using a nickel-containing plating bath, in which a current density is preferably 3 to 20 A/dm², and more preferably 6 to 10 A/dm². The nickel strike treatment time is preferably 1 minute or longer and 5 minutes or shorter.

[First Nickel-Containing Plating Film Layer]

A first nickel-containing plating film layer is formed on the metallic base material by the step (A). When the metallic base material is subjected to a nickel strike treatment, a nickel strike layer is included between the metallic base material and the first nickel-containing plating film layer.

From the viewpoint of increased corrosion resistance, the nickel-containing plating film layer preferably contains phosphorus, and preferably comprises a nickel-phosphorus alloy plating layer having a phosphorus concentration of 8% by mass or higher and lower than 10% by mass.

The first nickel-containing plating film layer has a nickel content of preferably 80% by mass or greater, more preferably 85% to 95% by mass, and particularly preferably 90% to 92% by mass in relation to 100% by mass of the entirety of the nickel-containing plating film layer. Due to the nickel content within the above range, the proportion of phosphorus in the film layer increases, which enables the exhibition of excellent corrosion resistance.

<Step (A)>

The first nickel-containing plating film layer may be formed on a metallic base material using an electroless plating bath comprising a nickel salt, and a phosphorus compound as a reducer. Examples of nickel salts are nickel sulfate, nickel chloride, nickel acetate, and nickel carbonate. Examples of phosphorus compounds are sodium hypophosphite and potassium hypophosphite.

The film formation rate of the first nickel-phosphorus alloy plating layer is preferably 20 to 30 μm/h (hour), and more preferably 22 to 25 μm/h (hour). The first nickel-phosphorus-containing plating film layer has a film thickness of preferably 5 μm or greater, and more preferably 7 to 25 μm. From the viewpoints of film properties of resisting pinhole formation and cost efficiency, the film thickness is still more preferably from 9 to 20 μm.

[Gold Plating Film Layer]

The gold plating film layer is formed on the nickel-containing plating film layer by the step (B).

The gold content in the gold plating film is, relative to 100% by mass of the entirety of the gold plating film layer, preferably 90% by mass or greater, more preferably 99% by mass or greater, and particularly preferably 99.9% by mass or greater. Due to the gold content within the above range, corrosion resistance of laminates according to the present invention is stabilized. The gold content is obtained by a method for quantifying impurities, namely by dissolving gold plating in aqua regia to measure the gold content by atomic absorption spectrometry and inductively coupled plasma (ICP) atomic emission spectrometry.

From the viewpoints of film properties of resisting pinhole formation and cost efficiency, the thickness of the gold plating film is preferably from 0.1 μm to 2 μm, more preferably 0.2 to 1.5 μm, and particularly preferably 0.3 to 0.8 μm. It is publicly known based on conventional art that the thicker the precious metal plating film is, the more the number of pinholes is reduced, and high corrosion resistance is expected to be achievable by increasing the thickness of a precious metal plating film. Considering the high price thereof, however, it is preferred to select an appropriate thickness.

<Step (B)>

Methods for forming the gold plating film layer are not particularly limited and an electroless gold plating method is preferred. In an electroless gold plating method, it is preferred to perform displacement gold plating and thereafter reduction gold plating. Namely, the step (B) preferably comprises a step (b1) of forming a displacement gold plating film layer, and a step (b2) of forming a reduction gold plating film layer after the step (b1).

In displacement gold plating, nickel is dissolved from a nickel film releasing electrons, which reduce gold ions in the solution, and the reduced gold ions in the solution are deposited as a gold plating film. In reduction gold plating, gold ions in the solution are reduced by electrons released due to an oxidation reaction by a reducer, and thereby a gold plating film is deposited.

Examples of electroless gold plating solutions are plating baths containing components such as gold potassium cyanide, gold chloride, gold sulfite, and gold thiosulfate. Examples of reducers are sodium hydroxide, dimethylamine borane, hexamethylenetetramine, and chain polyamines comprising an alkyl group having 3 or more carbon atoms and multiple amino groups.

The gold plating film layer may be formed by performing displacement gold plating preferably at a temperature of 50 to 90° C. for 3 to 7 minutes, more preferably at a temperature of 65 to 75° C. for 3 to 7 minutes, and by performing reduction gold plating preferably at a temperature of 55 to 65° C. for 7 to 15 minutes, more preferably at a temperature of 58 to 62° C. for 7 to 15 minutes.

[Second Nickel-Containing Plating Film Layer]

A second nickel-containing plating film layer is formed on the gold plating film layer by the step (C). When the gold plating film layer is subjected to nickel strike treatment, a nickel strike layer is included between the gold plating film layer and the second nickel-containing plating film layer.

From the viewpoint of increased corrosion resistance, the nickel-containing plating film layer preferably contains phosphorus, and preferably comprises a nickel-phosphorus alloy plating layer having a phosphorus concentration of 10% by mass or higher and 12% by mass or lower.

The second nickel-containing plating film layer has a nickel content of preferably 80% by mass or greater, more preferably 85% to 95% by mass, and particularly preferably 90% to 92% by mass in relation to 100% by mass of the entirety of the nickel-containing plating film layer. Due to the nickel content within the above range, the proportion of phosphorus in the film layer increases, which enables the exhibition of excellent corrosion resistance. In addition, when electroless nickel-phosphorus alloy plating films having different phosphorus concentrations are laminated, film formation proceeds while pinhole defects are formed in different positions. For this reason, disturbance hardly reaches the base material directly, and increased corrosion resistance is expected.

<Step (C)>

The second nickel-containing plating film layer may be formed on a metallic base material using an electroless plating bath comprising a nickel salt and a phosphorus compound as a reducer. Examples of the nickel salts are nickel sulfate, nickel chloride, nickel acetate, and nickel carbonate. Examples of the phosphorus compounds are sodium hypophosphite and potassium hypophosphite.

The film formation rate of the second nickel-phosphorus alloy plating layer is preferably 10 to 15 μm/h (hour), and more preferably 11 to 13 μm/h (hour). The second nickel-phosphorus alloy plating film layer has a film thickness of preferably 5 μm or greater, and more preferably 7 to 25 μm. From the viewpoints of film properties of resisting pinhole formation and cost efficiency, the film thickness is still more preferably from 10 to 20 μm.

[Sealing Treatment]

A sealing treatment is performed by sealing pinholes in the gold plating film layer with a metal which is a nickel simple substance, and by sealing pinholes in the first and second nickel-containing plating film layers with a metal which is a gold simple substance.

<Step (X)>

In the step (X), the laminate obtained in the step (C) is subjected to a heat treatment between the step (C) and the later-described step (D) to cause metal thermal diffusion. Thereby pinholes in the gold plating film layer are sealed with a metal which is a nickel simple substance, and pinholes in the first and second nickel-containing plating film layers are subjected to a sealing treatment with a metal which is a gold simple substance. The presence of gold and nickel simple substances can be confirmed by energy dispersive X-ray spectroscopy (EDS).

The heat conditions are preferably at a temperature of 250° C. or higher for 2 hours or longer, and more preferably at a temperature of 300 to 350° C. for 2 to 6 hours.

[Nickel Fluoride Film Layer]

A nickel fluoride film layer is formed on the second nickel-containing plating film layer. The nickel fluoride film layer is a passive film. The nickel fluoride film layer as a passive film is formed by subjecting a surface of the second nickel-containing plating film layer to a fluorination treatment in the step (D), on the nickel-containing plating film layer.

The thickness of the nickel fluoride film layer is preferably 70 nm or greater, more preferably 80 to 200 nm, and still more preferably 100 to 150 nm. Due to a thickness of the nickel fluoride film layer within the above range, adhesion between the gold plating film layer and the second nickel-containing plating film layer is increased.

<Step (D)>

In the step (D), a surface of the nickel-containing plating film layer, which has undergone the steps (A) to (C) and the step (X) if necessary, is fluorinated with fluorine gas to form a nickel fluoride film layer.

The step (D) is preferably performed in an atmosphere having a fluorine gas concentration of 8% by volume or higher, more preferably 10% by volume or higher. The film formation temperature is preferably 250° C. or higher, and more preferably 300° C. or higher. The fluorination treatment time is preferably 2 hours or longer. Examples of gases accompanying fluorine gas are inert gases such as nitrogen gas. In the embodiment of the present invention, a fluorinated passive film made up of a thick film of nickel fluoride is obtained under the above reaction conditions. By adjusting the thickness of the nickel alloy plating film, reaction temperature, and reaction time in accordance with the use of a member, the film thickness of the nickel fluoride film is adjustable in an intended way. The above reaction temperature means a temperature obtained by measuring a temperature of a gas atmosphere in a reactor with a thermocouple.

EXAMPLES

The present invention is more specifically described below with reference to, but not limited to, examples. The film thickness of each layer (excluding a nickel fluoride film layer) of a laminate was calculated based on the increased weight, layer area, and a known density. The film thickness of a nickel fluoride film layer was calculated by a later-described method which uses X-ray photoelectron spectroscopy (XPS).

Example 1

<Step (A)>

A surface of stainless steel (SUS316L) was subjected to a pretreatment comprising degreasing, acid cleaning, and a nickel strike treatment. On the surface of the stainless steel having undergone the nickel strike treatment, a first nickel-containing plating film layer (film thickness: 10 μm) having a phosphorus content of 8% by mass or greater and lower than 10% by mass in the formed film was formed using an electroless nickel-phosphorus plating chemical "NIMUDEN (trade name) NSX" (produced by C. Uyemura & Co., Ltd.) under the conditions of a plating temperature being 90° C. and a pH value being 4.5 to 4.8, for a plating time of 25 minutes.

<Step (B)>

Using 2 types of electroless gold plating solutions "Flash Gold NC (displacement type)" and "Self Gold OTK-IT (reduction type)" (both produced by Okuno Pharmaceutical Co., Ltd.) in this order, a treatment at a displacement plating temperature of 70° C. for 5 minutes and a treatment at a reduction plating temperature of 60° C. for 10 minutes were each performed in this order to form a gold plating film layer having a total thickness of 0.6 μm on the first nickel-containing plating film layer formed in the step (A).

<Step C>

A surface of the gold plating film layer formed in the step (B) was subjected to a nickel strike treatment in the same manner as described in the step (A). On a surface of the gold plating film layer having undergone the nickel strike treatment, a second nickel-containing plating film layer (film thickness: 10 μm) having a phosphorus content of 10% by mass or greater and 12% by mass or lower in the formed film was formed using an electroless nickel-phosphorus plating chemical "NIMUDEN (trade name) HDX" (produced by C. Uyemura & Co., Ltd.) for a plating time of 50 minutes.

<Step (X)>

The stainless steel having the first nickel-containing plating film layer, gold plating film layer, and second nickel-containing plating film layer formed in the steps (A), (B), and (C) was placed inside an atmospheric pressure gas-phase flow reactor, the temperature inside the reactor was increased to 300° C., and this state was maintained for 2 hours.

After heating, the stainless steel was analyzed by energy dispersive X-ray spectroscopy (EDS). It was confirmed that pinholes in the first and second nickel-containing plating film layers were sealed with a metal which is a gold simple substance and that pinholes in the gold plating film layer were sealed with a metal which is a nickel simple substance.

<Step (D)>

After the step (X), the atmosphere inside the atmospheric pressure gas-phase flow reactor was replaced with nitrogen gas, followed by the introduction of 100% by volume of oxygen gas to completely replace the nitrogen gas with oxygen gas, and this state was maintained for 12 hours. Subsequently, the oxygen gas was replaced with nitrogen gas, followed by the introduction of 10% by volume of fluorine gas (the remaining 90% by volume was nitrogen gas), and this state was maintained for 12 hours to form a nickel fluoride film layer. Further, nitrogen gas was supplied for 12 hours to stabilize the formed film. With respect to the obtained stainless steel having a nickel fluoride film as an outermost surface layer, the presence of nickel fluoride was confirmed based on the ratio of the amount of F to the amount of Ni detected by X-ray photoelectron spectroscopy (XPS). From the sputtering time and known sputtering rate of 2.4 nm/min (in terms of $SiO_2$) regarding F and Ni, the thickness of the nickel fluoride film was obtained to be 103 nm.

Example 2

The step (A) was performed in the same manner as described in Example 1 and thereafter the step (B) in Example 1 was performed in the same manner as described in Example 1 except for changing the reduction gold plating treatment time to 20 minutes in order to form a gold plating film layer having a thickness of 1.2 μm. Thereafter, the steps (C), (X), and (D) were performed in the same manner as described in Example 1. The thickness of the nickel fluoride film was obtained in the same manner as described in Example 1, and the thickness was 103 nm.

Example 3

An aluminum alloy (A5052) was used instead of the stainless steel (SUS316L) in Example 1 and a pretreatment comprising degreasing, an activation treatment, acid cleaning, and a zinc replacement treatment was performed. Thereafter, the steps (A), (B), (C), (X), and (D) were performed in the same manner as described in Example 1. The thickness of the nickel fluoride film was obtained in the same manner as described in Example 1, and the thickness was 103 nm. The activation treatment was performed using an acid mixture of ammonium acid fluoride and nitric acid as a treating agent at room temperature for 30 seconds. The acid cleaning was performed using nitric acid as a cleaning agent at room temperature for 25 seconds. The zinc replacement treatment was performed using a zincate bath as a treating agent at room temperature for 25 seconds. In addition, the acid cleaning and zinc replacement treatment were each performed twice under the above conditions.

Comparative Example 1

A surface of stainless steel (SUS316L) was subjected to a pretreatment comprising degreasing, acid cleaning, and a nickel strike treatment. On a surface of the stainless steel having undergone the nickel strike treatment, a first nickel-containing plating film layer having a phosphorus content of 8% by mass or greater and lower than 10% by mass in the formed film was formed using an electroless nickel-phosphorus plating chemical "NIMUDEN (trade name) NSX" (produced by C. Uyemura & Co., Ltd.) under the conditions of a plating temperature being 90° C. and a pH value being 4.5 to 4.8, at a film formation rate of 10 μm/25 minutes. Subsequently, a second nickel-containing plating film layer having a phosphorus content of 10% by mass or greater and 12% by mass or lower in the formed film was formed using an electroless nickel-phosphorus plating chemical "NIMUDEN (trade name) HDX" (produced by C. Uyemura & Co., Ltd.) at a film formation rate of 10 μm/50 minutes. Thereby, nickel-containing plating film layers having a total thickness of 20 μm were formed on the stainless steel having undergone the nickel strike treatment. The step (D) was thereafter performed in the same manner as described in Example 1. Thereby, the nickel-containing plating film layers and a nickel fluoride film layer were formed on a surface of the stainless steel having undergone the nickel strike treatment.

Comparative Example 2

In Comparative Example 1, an aluminum alloy (A5052) was used as the metallic base material instead of stainless steel (SUS316L), a pretreatment comprising degreasing, an activation treatment, acid cleaning, and a zinc replacement treatment was performed, and thereafter electroless nickel-phosphorus alloy plating film layers and a nickel fluoride film layer were formed in the same manner as described in Comparative Example 1.

Comparative Example 3

In Example 1, only the steps (A), (B), and (C) were performed, that is, the steps (X) and (D) were not performed, to form a first nickel-containing plating film layer, a gold plating film layer, and a second nickel-containing plating film layer on stainless steel.

[Evaluation]

A hydrochloric acid corrosion resistance test was performed on the films formed on the surfaces of the metallic base materials obtained in the above Examples 1 to 3 and Comparative Examples 1 to 3. The evaluation results are summarized in Table 1.

<Hydrochloric Acid Corrosion Resistance Test>

A test piece in a size of 15 mm (length)×15 mm (width)×1 mm (thickness) was immersed in a 35% by mass hydrochloric acid solution at a temperature of 25° C. for 5 hours. Based on the reduced amount of mass [mg/dm$^2$] before and after the immersion, hydrochloric acid corrosion resistance was evaluated in accordance with the following criteria.

(Evaluation Criteria)
A: less than 0.1 mg/dm$^2$
B: 0.1 mg/dm$^2$ or greater and less than 3.0 mg/dm$^2$
C: 3.0 mg/dm$^2$ or greater and less than 10.0 mg/dm$^2$
D: 10.0 mg/dm$^2$ or greater

TABLE 1

|  | Example 1 | Example 2 | Example 3 | Comparative Example 1 | Comparative Example 2 | Comparative Example 3 |
|---|---|---|---|---|---|---|
| Metallic base material | SUS | SUS | Al | SUS | Al | SUS |
| First nickel-containing plating film layer [μm] | 10 | 10 | 10 | 10 | 10 | 10 |
| Second nickel-containing plating film layer [μm] | 10 | 10 | 10 | 10 | 10 | 10 |
| Gold plating film layer [μm] | 0.6 | 1.2 | 0.6 | — | — | 0.6 |
| Nickel fluoride film layer [nm] | 103 | 103 | 103 | 103 | 103 | — |
| Hydrochloric acid corrosion resistance | B | A | B | C | C | D |

In Table 1, SUS means stainless steel (SUS316L) and Al means an aluminum alloy (A5052).

REFERENCE SIGNS LIST

1 Metallic base material
2 First nickel-containing plating film layer
3 Gold plating film layer
4 Second nickel-containing plating film layer
5 Nickel fluoride film layer
6 Pinhole
7 Location where pinhole was subjected to sealing treatment

The invention claimed is:

1. A laminate comprising
   a metallic base material,
   a first nickel-containing plating film layer formed on the metallic base material,
   a gold plating film layer formed on the first nickel-containing plating film layer,
   a second nickel-containing plating film layer formed on the gold plating film layer, and
   a nickel fluoride film layer formed on the second nickel-containing plating film layer.

2. The laminate according to claim 1, wherein pinholes in the gold plating film layer are sealed with a metal which is a nickel simple substance, and
   pinholes in the first and second nickel-containing plating film layers are sealed with a metal which is a gold simple substance.

3. The laminate according to claim 1, wherein the metallic base material comprises at least one metal selected from the group consisting of stainless steel, iron, aluminum, aluminum alloys, copper, and copper alloys.

4. The laminate according to claim 1, having a nickel strike layer between the metallic base material and the first nickel-containing plating film layer, and between the gold plating film layer and the second nickel-containing plating film layer.

5. The laminate according to claim 1, wherein the first nickel-containing plating film layer comprises a nickel-phosphorus alloy plating layer having a phosphorus concentration of 8% by mass or higher and lower than 10% by mass, and the second nickel-containing plating film layer comprises a nickel-phosphorus alloy plating layer having a phosphorus concentration of 10% by mass or higher and 12% by mass or lower.

6. The laminate according to claim 1, wherein the gold plating film layer comprises a displacement gold plating film layer and a reduction gold plating film layer in this order from the first nickel-containing plating film layer.

7. The laminate according to claim 1, wherein the nickel fluoride film layer has a thickness of 70 nm or greater.

8. A constituent member of a semiconductor production device, made up of the laminate according to claim 1.

9. A method for producing the laminate according to claim 1, comprising
a step (A) of forming the first nickel-containing plating film layer on a metallic base material,
a step (B) of forming the gold plating film layer on the first nickel-containing plating film layer,
a step (C) of forming the second nickel-containing plating film layer on the gold plating film layer, and
a step (D) of forming the nickel fluoride film layer on the second nickel-containing plating film layer.

10. The method for producing a laminate according to claim 9 comprising a step (X) between the step (C) and the step (D), wherein the laminate obtained in the step (C) is subjected to a heat treatment under the condition of a temperature being 250° C. or higher in order to seal pinholes in the gold plating film layer with a metal which is a nickel simple substance and seal pinholes in the first and second nickel-containing plating film layers with a metal which is a gold simple substance.

11. The method for producing a laminate according to claim 9, wherein the step (D) is performed in an atmosphere in which a fluorine gas concentration is 8% by volume or higher and a temperature is 250° C. or higher.

12. The method for producing a laminate according to claim 9, comprising a step of subjecting the metallic base material to a nickel strike treatment under the condition of a current density of 3 to 20 A/dm$^2$ before the step (A) and before the step (C).

13. The method for producing a laminate according to claim 9,
wherein the step (A) comprises a step of forming a nickel-phosphorus alloy plating layer having a phosphorus concentration of 8% by mass or higher and lower than 10% by mass, and
the step (C) comprises a step of forming a nickel-phosphorus alloy plating layer having a phosphorus concentration of 10% by mass or higher and 12% by mass or lower.

14. The method for producing a laminate according to claim 9, wherein the step (B) comprises a step (b1) of forming a displacement gold plating film layer, and a step (b2) of forming a reduction gold plating film layer after the step (b1).

* * * * *